No. 653,973. Patented July 17, 1900.
D. SVENSON.
HOG CATCHER.
(Application filed Mar. 29, 1900.)

(No Model.)

Witnesses
Robert Otto.
Harry Kilgore.

Inventor
Daniel Svenson
By his Attorneys
Williamson & Merchant

UNITED STATES PATENT OFFICE.

DANIEL SVENSON, OF TWIN VALLEY, MINNESOTA.

HOG-CATCHER.

SPECIFICATION forming part of Letters Patent No. 653,973, dated July 17, 1900.

Application filed March 29, 1900. Serial No. 10,591. (No model.)

*To all whom it may concern:*

Be it known that I, DANIEL SVENSON, a citizen of the United States, residing at Twin Valley, in the county of Norman and State of Minnesota, have invented certain new and useful Improvements in Hog-Catchers; and I do hereby declare the following to be a full, clear, and exact description of the invention, such as will enable others skilled in the art to which it appertains to make and use the same.

My present invention has for its especial object to provide an efficient hog-catching device, which device is, however, capable of use for catching various other animals.

To these ends the invention consists of the novel devices and combinations of devices hereinafter described, and defined in the claims.

It is a well-known fact that a hog when allowed to run wild is a very difficult animal to catch, and, furthermore, that any hog is a very difficult animal to hold even after it has been caught. Hence I will describe this device as a hog-catcher, although it is not limited to such a use, and its use for catching other animals will become obvious.

The invention in its preferred form is illustrated in the accompanying drawings, wherein like characters indicate like parts throughout the several views.

Figure 1:
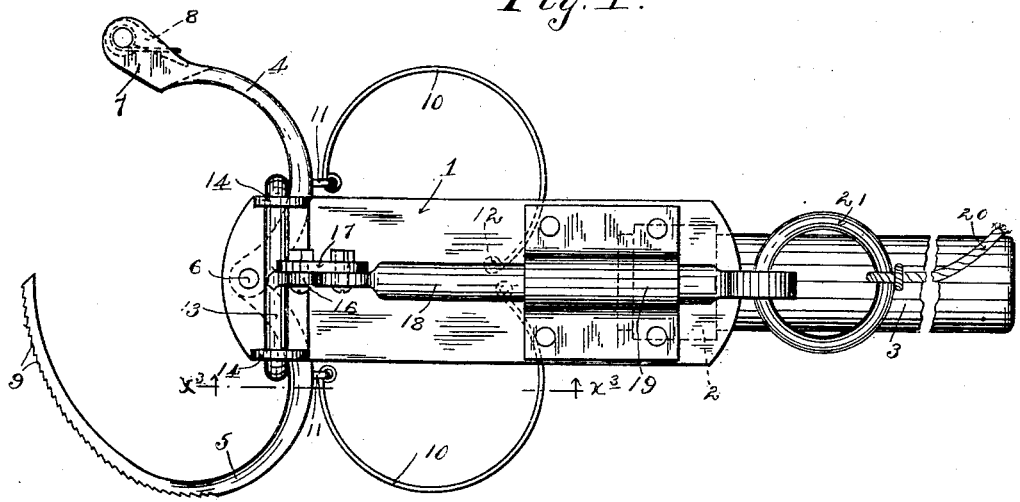
Figure 2:
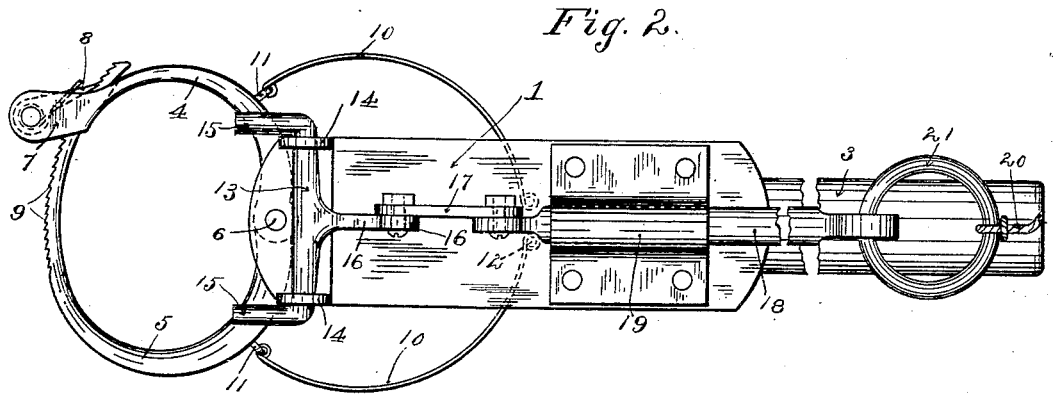
Figure 3:
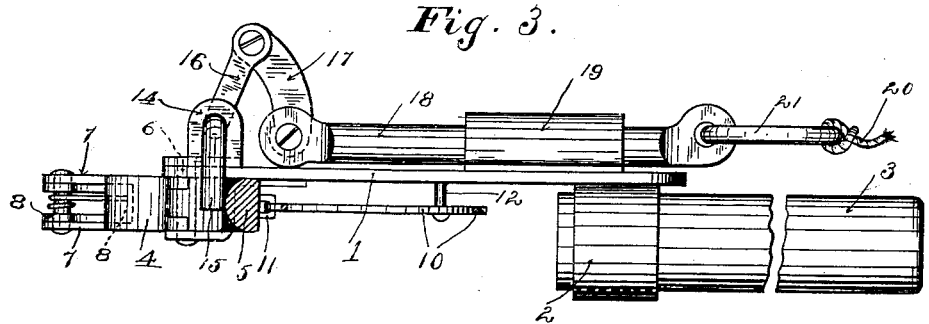

Figure 1 is a plan view of the device with the jaws thereof shown as opened. Fig. 2 is a similar view to Fig. 1, but shows the jaws of the device as closed; and Fig. 3 is a longitudinal section approximately on the line $x^3$ $x^3$ of Fig. 1.

The body or head of the device is shown as in the form of a flat plate or thin strip of metal 1, which is suitably secured by a socket-piece 2 to the end of a long pole 3. To the outer end of the head 1 a pair of clamping-jaws 4 and 5 are pivoted at 6. The jaw 4 is bifurcated at 7 and provided with a spring-pressed pawl 8, and the outer portion of the jaw 5 is struck on the arc of a circle having the center of the pivot 6 as its center. The outer segmental portion of the jaw 5 is adapted to work between the prongs 7 of the jaw 4, and it is provided with ratchet-teeth 9, with which the pawl 8 engages to hold the jaws when closed against opening movements, as hereinafter described. The jaws 4 and 5 are put under yielding strain to automatically close when released by springs 10, which, as shown, are attached to eyes 11 on the said jaws and to studs or pins 12 on the said head 1, but which may, nevertheless, take various other forms and be otherwise applied. The jaws are adapted to be set and held in open positions against the actions of the springs 10 and to be released at will by means of the trip-latch, which, as preferably constructed, comprises as follows: 13 indicates a short rock-shaft mounted in suitable bearings 14 on the head 1 and provided with angled ends 15, adapted to engage the inner portions of the jaws 4 and 5, as shown in Figs. 1 and 3. This rock-shaft 13 has a central arm 16, which is pivotally connected to the upper end of a short link 17, the lower end of which in turn is pivoted to the forward end of a sliding bolt or plunger 18, that is mounted to slide in a suitable keeper 19 on the upper face of the head 1. The forward end of the bolt or plunger 18, when the jaws 4 and 5 are set and held open, is frictionally pressed into engagement with the upper surface of the head 1 at a point so nearly in line with a perpendicular struck from the upper surface of said head 1 through the pivotal connection between the arm 16 and the link 17 that the force of the springs 10 will not drive the plunger 18 rearward. Hence when the parts are so set the jaws 4 and 5 will be held open.

To enable the bolt or plunger 18 to be drawn rearward and the jaws 4 and 5 to be thereby released by the operator holding the device from the farther end of the pole, a flexible connection 20, preferably in the form of a strong cord, is attached to said plunger 18, as shown, by means of a ring 21 in the rear end of said plunger.

The operation is probably already understood, but may be briefly summed up as follows: The operator holding the device from the farther end of the pole 3 may without much trouble get close enough to a hog or other animal to place the open jaws over the leg of the said animal, and this having been done he jerks on the cord 20, thereby releasing the jaws, as above described. The jaws being released will close onto the leg of the hog or other animal, due to the action of the springs 10, and the engagement of the spring-pressed pawl 8 with the ratchet-teeth 9 will lock the said jaws onto the leg. As is evident, a hog once caught by this device cannot get away, and, furthermore, the device will do no damage to the hog's leg.

From the foregoing description it will of course be understood that the device above described is capable of various modifications within the scope of my invention.

What I claim, and desire to secure by Letters Patent of the United States, is as folows:

1. A device adapted for use in catching hogs or other animals, comprising a head, a pair of spring-pressed jaws pivoted thereto, a pawl-and-ratchet device for locking said jaws closed, and a trip-latch for holding said jaws open, comprising a rock-shaft having projections engageable with said jaws, and a toggle-lever connection to said rock-shaft adapted to be set in such proximity to a dead-center that it will be frictionally held until tripped, substantially as described.

2. The combination with the head 1, of the spring-pressed jaws 4, 5, pivoted at 6 and provided, respectively, with the pawl 8 and ratchet-teeth 9, the rock-shaft 13 having the ends 15 engaging said jaws, and having also the arm 16, the sliding plunger 18 connected to said arm 16 by a link 17, the said parts operating substantially as described, and a connection to said plunger for tripping the same from a distant point, substantially as described.

In testimony whereof I affix my signature in presence of two witnesses.

DANIEL SVENSON.

Witnesses:
L. BJORNSON,
J. L. WALD.